Oct. 22, 1929.                A. SEDLMEIER                 1,732,570
                                 AEROPLANE
                            Filed Aug. 27, 1928        4 Sheets-Sheet 1
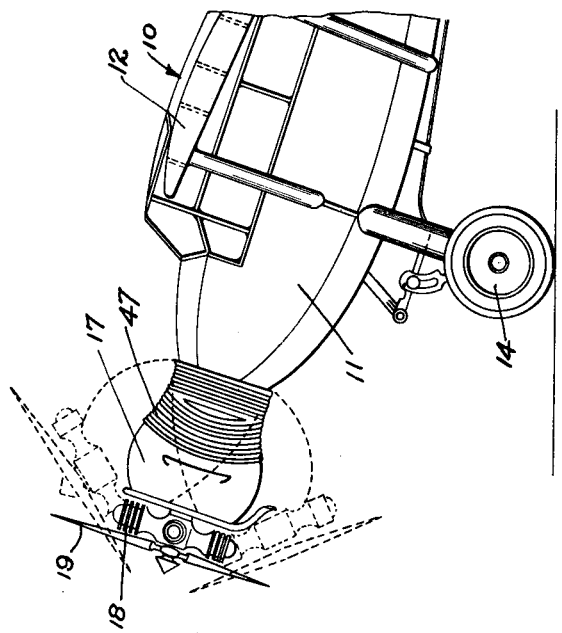
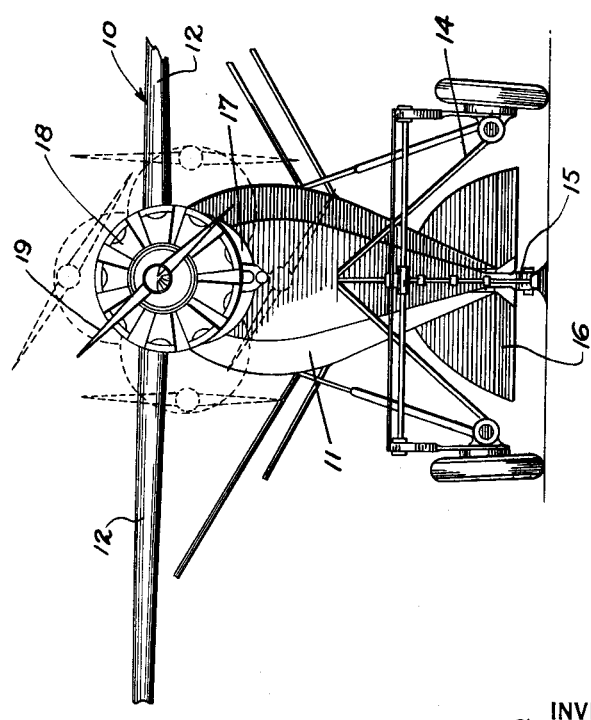
INVENTOR.
Andrew Sedlmeier
BY
Townsend, Loftus & Abbett
ATTORNEYS.

Oct. 22, 1929.　　　A. SEDLMEIER　　　1,732,570
AEROPLANE
Filed Aug. 27, 1928　　　4 Sheets-Sheet 2
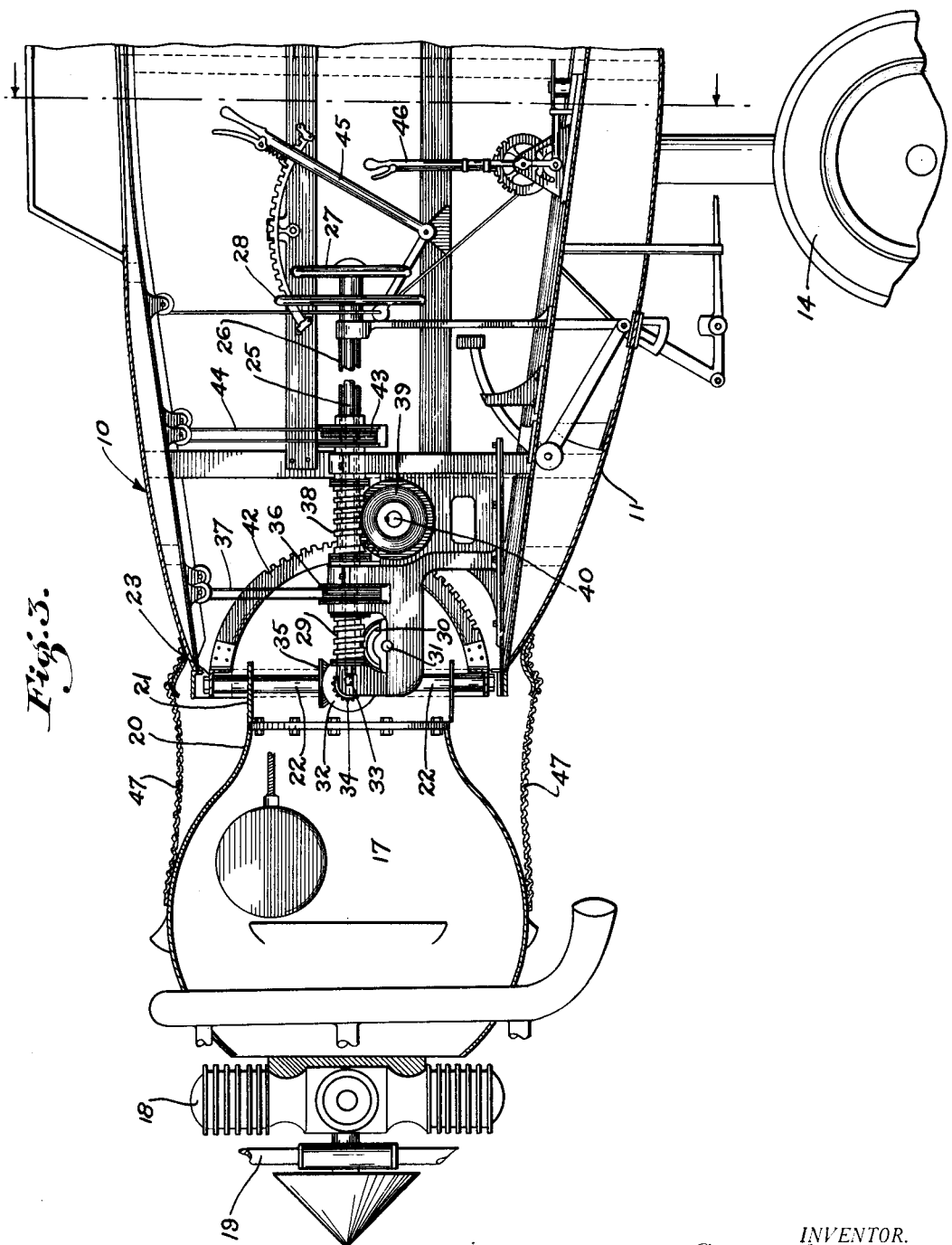
INVENTOR.
Andrew Sedlmeier
BY
Townsend, Loftus & Abbett
ATTORNEYS.

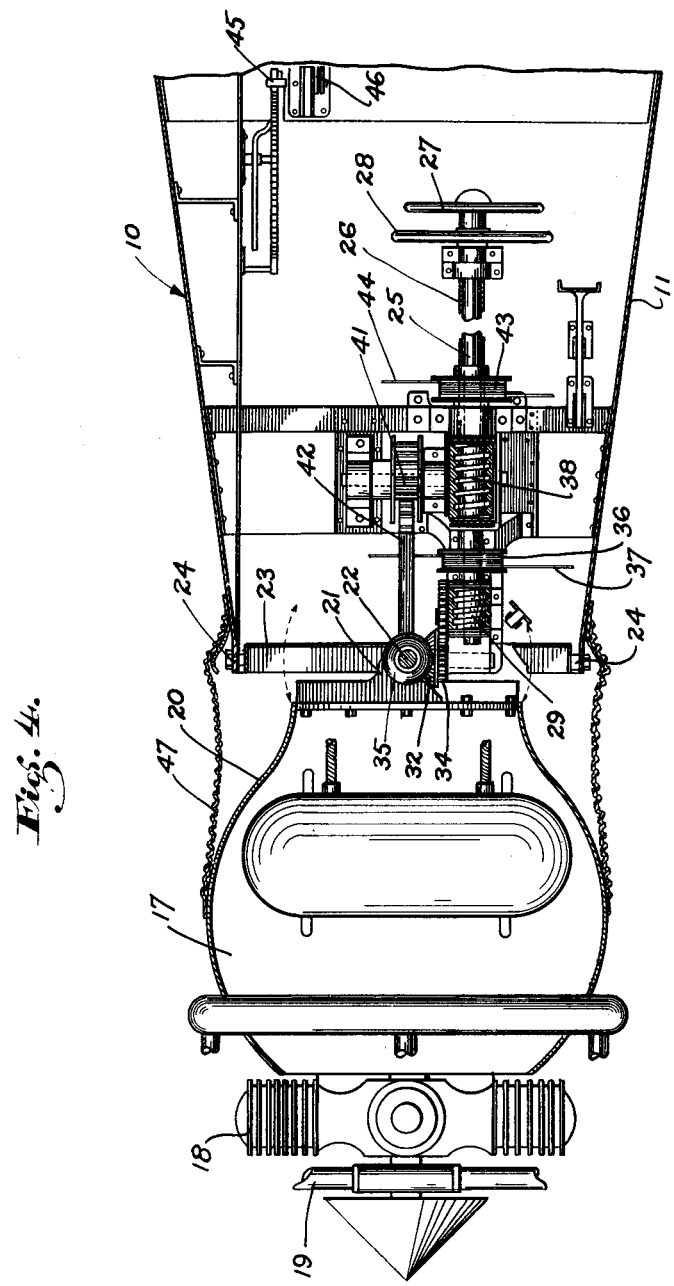

Oct. 22, 1929.  A. SEDLMEIER  1,732,570
AEROPLANE
Filed Aug. 27, 1928  4 Sheets-Sheet 4
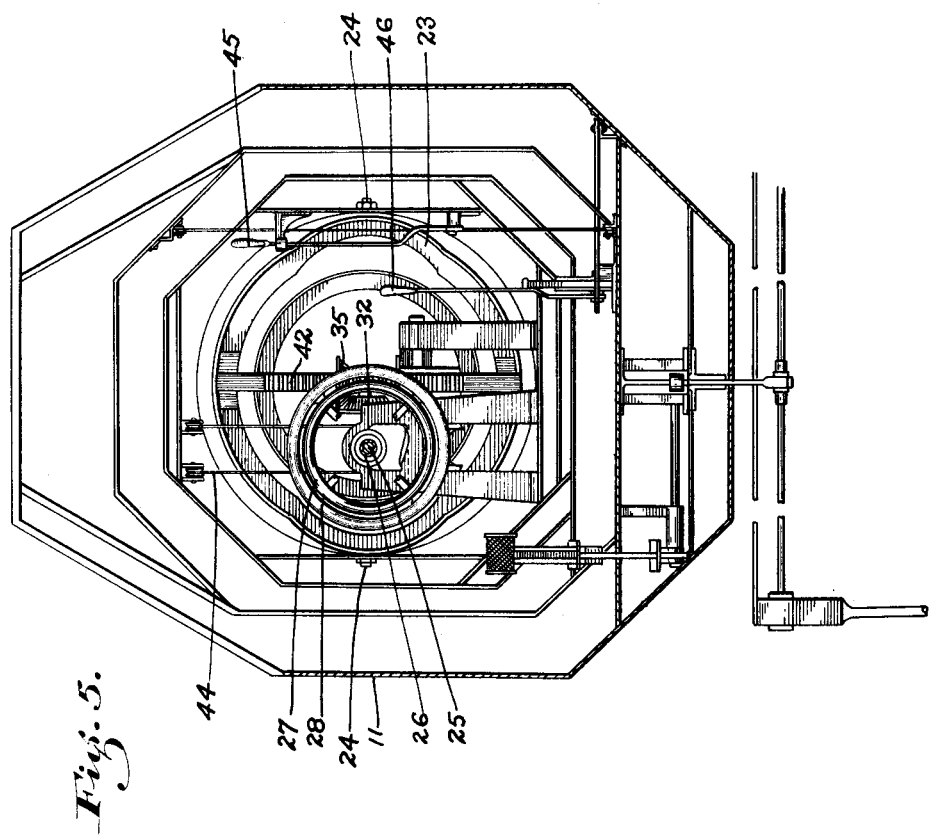

Patented Oct. 22, 1929

1,732,570

UNITED STATES PATENT OFFICE

ANDREW SEDLMEIER, OF OAKLAND, CALIFORNIA

AEROPLANE

Application filed August 27, 1928. Serial No. 302,170.

This invention relates to aircraft and particularly pertains to apparatus for controlling and maneuvering aeroplanes.

It is the principal object of the present invention to provide improved means enabling aircraft to be more easily and quickly maneuvered and more effectively controlled than hitherto.

I accomplish this object by equipping the aeroplane with apparatus enabling the driving propeller to be turned at any desired angle to the longitudinal axis of the craft so that the propeller will cooperate with the elevators and rudders in maneuvering and controlling the craft.

One form which the invention may assume is exemplified in the following description and illustrated by way of example in the accompanying drawings, in which:

Fig. 1 is a front elevation of an aeroplane embodying the preferred form of my invention.

Fig. 2 is a fragmentary view in side elevation of the same.

Fig. 3 is an enlarged fragmentary view in vertical longitudinal section through the fuselage of the plane showing the manner in which the motor and propeller is mounted thereon.

Fig. 4 is a view similar to Fig. 3 with the excepton that it is in plan section.

Fig. 5 is a transverse sectional view through the fuselage of the plane taken on line V—V of Fig. 3.

Referring more particularly to the accompanying drawings, 10 indicates an aeroplane of the monoplane type which is designed in accordance with the teachings of the present invention. It is to be understood, however, that although in the present instance a monoplane is illustrated, the present invention is applicable to any type of aircraft using propellers as a driving medium. The monoplane 10 illustrated includes the usual fuselage 11, wings 12, landing gear 14, rudder 15, and elevators or ailerons 16.

Mounted directly at the forward end of the fuselage in alignment therewith is a substantially spherical housing or engine mounting 17. A motor 18 is rigidly mounted at the outer end of the mounting 17 and a propeller 19 is arranged on the shaft of the motor 18 as in standard practice. I have here disclosed a radial type of motor and illustrate the motor as secured at the forward end of the housing or mounting 17. This is not essential, however, as the motor may be of any other type just so that it is mounted and carried by the mounting or housing 17. The motor and propeller are arranged in axial alignment with the housing 17 as illustrated in the drawings.

The rear end of the housing or mounting 17 terminates in a cylindrical extension 20 having bearing lugs 21 rigidly secured to the top and bottom thereof in vertical alignment and at diametrically opposite points. These lugs 21 project inwardly and are secured to a vertical shaft 22, the ends of which are mounted in a mounting ring 23 arranged concentric to the cylindrical extension 20 of the housing 17 but within the end of the fuselage. This mounting ring 23 is pivotally connected at its opposite sides as at 24 to the fuselage so that it may swing in a vertical plane longitudinally of the fuselage. The pivotal points of the mounting ring 23 occur at the horizontal center of the ring as illustrated in Figs. 4 and 5.

By the mounting just described the housing or motor mounting 17 may be swung horizontally about the axis of the vertical shaft 22 and vertically about the pivotal connections of the mounting ring 23. The shaft 22 as described is carried by the mounting ring. Therefore, it is obvious that by changing the position of the housing through operation of the ring 23 or turning of the shaft 22, the axis of the housing 17 and consequently the axis of the motor and propeller will be arranged at an angle to the axis of the fuselage and the plane.

To angle the housing or mounting 17, I provide a pair of concentrically arranged shafts 25 and 26 which are suitably journalled within the front end of the fuselage as most clearly illustrated in Figs. 3 and 4. The shaft 25 is fitted with a control wheel 27 while the shaft 26 is fitted with a control wheel 28. Both of these control wheels are disposed convenient to the pilot's seat in the fuselage. The shaft 25 is designed to revolve the vertical shaft 22 to swing the housing 17 horizontally and to simultaneously operate the rudder at the tail of the ship.

This is accomplished by fitting the shaft 25 with a worm 29 which meshes with a worm gear 30 on a countershaft 31. This worm gear 30 drives a bevel gear 32 on a jack shaft 33 through the medium of a pair of spur gears 34. The bevel gear 32 meshes with a bevel gear 35 secured on the vertical shaft 22 so that turning movement of the control wheel 27 will result in turning of the shaft 22 and the housing 17 about the axis of the shaft 22. The direction in which the housing is turned depends, of course, entirely upon the direction in which the control wheel is revolved.

I intend that swinging of the housing in a horizontal plane be accompanied by operation of the rudder. This is accomplished by fitting the shaft 25 with a sheave 36 about which a control cable 37 is wound. The ends of this cable 37 are led to the rudder in the usual manner so that turning movement of the sheave 36 will be accompanied by operation of the rudder. This is so arranged that when the forward end of the housing 17 is swung to the left, the rear end of the rudder will be swung to the left so that the plane will negotiate a left turn. Thus, the rudder and propeller cooperate in turning the plane.

The housing is swung in a vertical plane in a manner very similar to that just described. That is, the shaft 26 is fitted with a worm 38 meshing with a worm wheel 39 on a countershaft 40. This countershaft 40 is fitted with a pinion 41 meshing with a segment 42 secured vertically and centrally of the mounting ring 23. The segment is disposed at right angles to the mounting ring 23 as most clearly shown in Fig. 3.

It is obvious, therefore, that upon turning movement of the shaft 26 through the medium of the control wheel 28, the pinion 41 will be revolved through the medium of the worm and worm wheel 38 and 39. Turning movement of the pinion 41 will impart movement to the segment 42 which is arranged concentric to the pivotal axis of the mounting ring 23. Thus, this mounting ring will be turned in a vertical plane and cause movement of the housing 17 in a vertical plane.

Vertical movement of the housing 17 will be accompanied by operation of the elevators at the tail end of the ship. This is accomplished by the provision of a sheave 43 on the shaft 26. A control rope 44 is wound about this sheave and its ends connected with the elevators 16 in the usual manner, so that operation of the housing 17 will be accompanied by operation of the elevators. It is desired to point out that when seeking to rise, the propeller 19 is turned upwardly and the elevators are likewise turned upwardly and when seeking to descend, the motor 19 is turned downwardly as are the elevators.

I have shown separate controls 45 and 46 for controlling the rudder and elevators independently of the propeller.

It will be noticed from the drawings that a flexible shield 47 is connected to the end of the fuselage and to the housing 17 to enclose the connection therebetween.

The arrangement which enables the propeller to be arranged at an angle to the plane and its line of flight has a considerable number of advantages. For example, when the plane is in a tail spin, the propeller may be elevated so that the pull thereof will bring the ship out of the spin. Likewise, by arranging the propeller at a slight angle horizontally, side slippage due to a strong wind may be compensated for.

Another advantage is that the plane may take off more quickly as the propeller may be tilted upwardly slightly to assist in lifting the ship.

Further, a safer landing may be negotiated because the motor and propeller may be gradually elevated which will tend to decrease the forward speed of the plane and allow the latter to settle when landing.

The principal advantage, however, is the fact that the plane may be maneuvered in arcs of a lesser radius than it is possible to turn the plane with merely rudders and elevators.

It is obvious, therefore, that by the use of my present invention a plane may be more easily and quickly maneuvered and more effectively controlled than hitherto.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An aeroplane comprising a fuselage with the usual wings, a rudder and elevator mechanism at the tail of the fuselage, an engine mounting disposed at the front end of the fuselage in alignment therewith, a universal connection between said mounting and said fuselage enabling the mounting to be moved to any angle both vertically and horizontally with respect to the longitudinal axis of the fuselage, a motor carried by said mounting, a propeller driven by the motor, operative means for adjusting the angular position of said mounting both vertically and horizontally with respect to the axis of the fuselage, said operative means being operatively connected to the rudder and elevator mechanism whereby operation of the rudder and elevator mechanism will be accompanied by cooperative adjustment of the propeller, and independent means for controlling the rudder and elevator mechanism.

2. An aeroplane comprising a fuselage with the usual wings, a rudder and elevator mechanism at the tail of the fuselage, a housing at the front of the fuselage in alignment therewith, a motor fixed at the forward end of said housing, a universal connection between said housing and said fuselage enabling the housing to be moved universally with respect to the fuselage, and a flexible shield connected to the housing and to the fuselage to enclose the connection therebetween.

3. An aeroplane comprising a fuselage, a housing at the front of the fuselage provided with a cylindrical extension and arranged in alignment with the said fuselage, a motor fixed at the forward end of said housing, and a universal connection between said housing and said fuselage having a ring arranged concentric with the cylindrical extension and mounted on the fuselage.

4. An aeroplane comprising a fuselage, a housing at the front of the fuselage in alignment therewith, said housing being provided with a cylindrical extension, a universal connection between the cylindrical extension and the fuselage including a vertical shaft fixed to the cylindrical extension of the housing and a mounting ring pivoted within the fuselage for movement on a horizontal axis and carrying the vertical shaft, the latter forming a pivot for the housing, a motor fixed at the forward end of said housing, and operating means for the universal connection including gearing connected with the vertical shaft and with the mounting ring.

5. An aeroplane comprising a fuselage, a housing at the front of the fuselage in alignment therewith, said housing being provided with a cylindrical extension, a universal connection between the cylindrical extension and the fuselage including a vertical shaft fixed to the cylindrical extension of the housing and a mounting ring pivoted within the fuselage for movement on a horizontal axis and carrying the vertical shaft, the latter forming a pivot for the housing, a motor fixed at the forward end of said housing, a toothed segment fixed to the mounting ring midway between the sides thereof, concentric operating shafts having spaced worms, and separate gearing for transmitting motion from one of the worms to the vertical shaft and from the other worm to the toothed segment.

6. An aeroplane comprising a fuselage, a housing at the front of the fuselage in alignment therewith, said housing being provided with a cylindrical extension, a universal connection between the cylindrical extension and the fuselage including a vertical shaft fixed to the cylindrical extension of the housing and a mounting ring pivoted within the fuselage for movement on a horizontal axis and carrying the vertical shaft, the latter forming a pivot for the housing, a motor fixed at the forward end of said housing, a toothed segment fixed to the mounting ring midway between the sides thereof, concentric operating shafts having spaced worms, and separate gearing for transmitting motion from one of the worms to the vertical shaft and from the other worm to the toothed segment, spaced sheaves mounted on the said concentric shafts, a rudder, an elevating mechanism at the tail of the fuselage, and cables arranged on the said sheaves and connected with the rudder and elevating mechanism for operating the same simultaneously with the adjustment of the housing.

ANDREW SEDLMEIER.